United States Patent
Norte

(10) Patent No.: US 7,348,862 B1
(45) Date of Patent: Mar. 25, 2008

(54) MODULAR CONNECTOR WITH SUPPRESSION OF CONDUCTED AND RADIATED EMISSIONS

(75) Inventor: David Norte, Westminster, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 395 days.

(21) Appl. No.: 11/196,658

(22) Filed: Aug. 2, 2005

(51) Int. Cl.
*H04B 3/28* (2006.01)
*H01R 13/66* (2006.01)

(52) U.S. Cl. .................. 333/12; 333/181; 439/620.05; 439/620.23

(58) Field of Classification Search .................. 333/12, 333/181, 185; 439/541.5, 620.05, 620.13, 439/620.18, 620.23
See application file for complete search history.

(56) References Cited

U.S. PATENT DOCUMENTS

| | | | |
|---|---|---|---|
| 5,971,813 A | | 10/1999 | Kunz et al. |
| 6,171,152 B1 | | 1/2001 | Kunz |
| 6,227,911 B1 | * | 5/2001 | Boutros et al. ......... 439/620.18 |
| 6,334,787 B1 | * | 1/2002 | Chang ......................... 439/490 |
| 6,663,423 B2 | * | 12/2003 | Belopolsky et al. ..... 439/541.5 |
| 6,881,096 B2 | * | 4/2005 | Brown et al. .......... 439/620.01 |
| 7,123,117 B2 | * | 10/2006 | Chen et al. .................. 333/177 |
| 2004/0164619 A1 | * | 8/2004 | Parker et al. ................. 307/80 |

* cited by examiner

*Primary Examiner*—Seungsook Ham
(74) *Attorney, Agent, or Firm*—David Volejnicek

(57) ABSTRACT

An RJ 45 connector for unshielded CAT5 cable has electromagnetic-interference-suppression circuitry to meet the Class B conducted and radiated emissions standard. The connector comprises, in addition to signal-conditioning transformers, a current-blocking ferrite and a plurality of pairs of common-mode filters, one pair for each conductor of each active twisted pair of the cable. Each pair of filters is connected in series with each other between a conductor of an active twisted pair and a transformer winding, and meets or exceeds the impedance, reactance, and resistance curves of FIGS. 2-4. The ferrite is connected in series with each conductor of each inactive pair of the cable and across a capacitor to ground, and meets or exceeds the impedance, reactance, and resistance curves of FIGS. 5-7.

12 Claims, 7 Drawing Sheets

MODULAR CONNECTOR WITH SUPPRESSION OF CONDUCTED AND RADIATED EMISSIONS

TECHNICAL FIELD

This invention relates to suppression of electromagnetic interference.

BACKGROUND OF THE INVENTION

CAT5 unshielded twisted pair cable terminating in an RJ45 modular connector is typically used for local data transmissions, such as the 100 Mb Ethernet local area network (LAN). Prior art regarding RJ45 connectors with integrated signal-conditioning magnetics for 100 Mb Ethernet applications is bountiful. Examples thereof include U.S. Pat. Nos. 5,971,813 and 6,171,152. But, to my knowledge, none can provide Class B electromagnetic interference performance with unshielded CAT5 cable. Class B is a conducted and radiated emissions standard of the FCC Part 15 in the US and of CISPR 22 internationally. Some of the existing connectors can provide Class B performance with shielded CAT5 cable. But shielded cable is expensive and therefore not widely used. For example, the cabling infrastructure of most businesses uses unshielded CAT5 cable to make data connections to employees' desktops.

SUMMARY OF THE INVENTION

Generally according to an embodiment of this invention, there is provided a connector that provides Class B electromagnetic interference performance with unshielded data cable. Illustratively, there is provided an RJ45 modular connector that provides Class B performance with unshielded CAT5 cable. According to an aspect of the invention, at least one of a socket and a corresponding jack that together form a connector for a data transmission medium that has a plurality of pairs of conductors, comprises, for each conductor of each active pair of conductors, a pair of common-mode filter inductors connected in series with each other and with the conductor, where the pair of inductors substantially meet or exceed the impedance, reactance, and resistance curves of FIGS. 2-4, respectively. The at least one of the socket and the jack further comprises a direct current-blocking inductor connected in series with each conductor of each inactive pair of the pairs of conductors and ground, where the inductor substantially meets or exceeds the impedance, reactance, and resistance curves of FIGS. 5-7, respectively.

BRIEF DESCRIPTION OF THE DRAWING

These and other features and advantages of the invention will become more apparent from the following description of an illustrative embodiment of the invention considered together with the drawing, in which.

DETAILED DESCRIPTION

Figure 1:
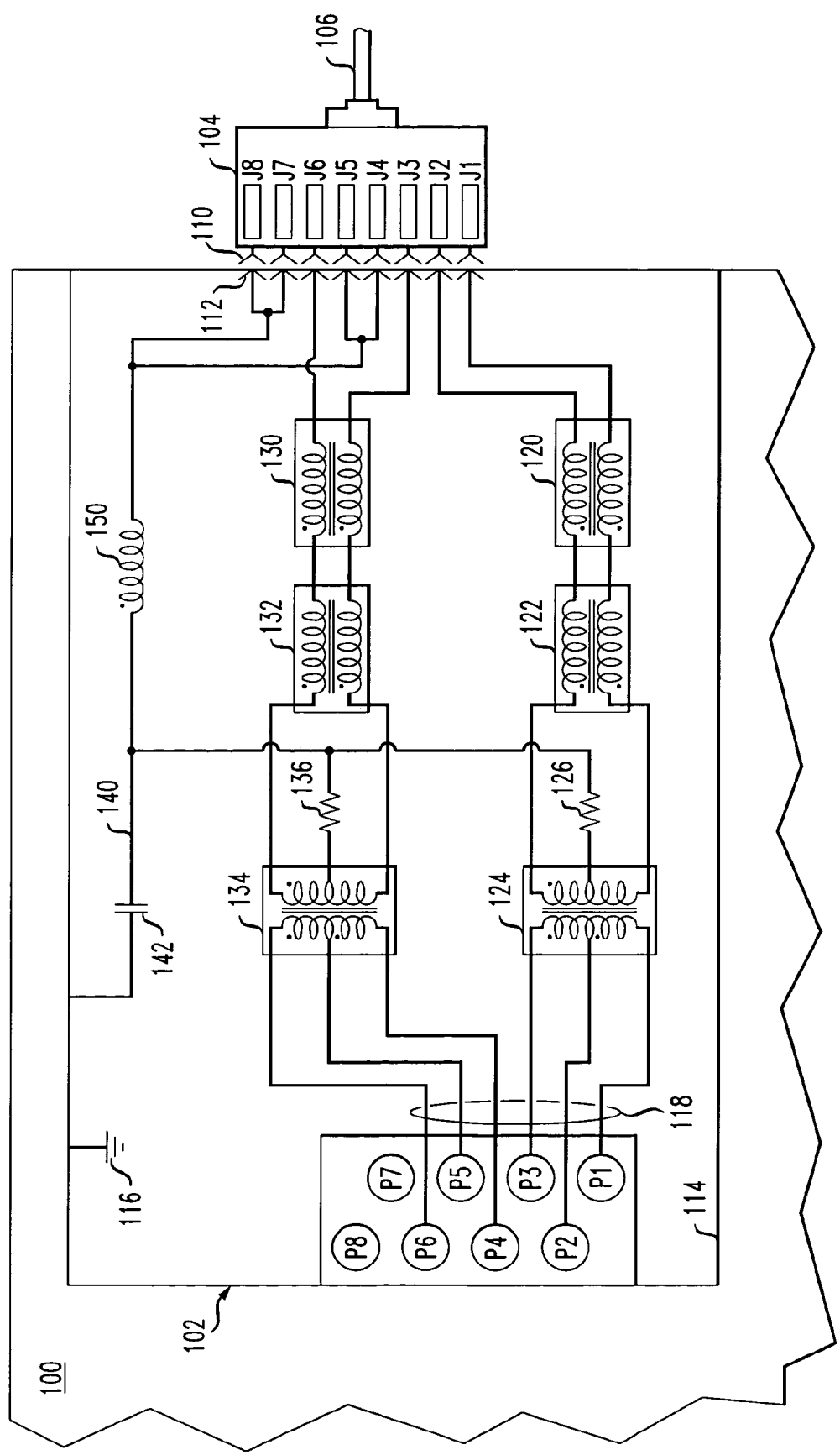
FIG. 1 is pseudo-schematic diagram of a modular connector that includes an illustrative embodiment of the invention.

FIG. 1 shows schematically an RJ45 connector comprising an RJ45 socket 102 and an RJ45 jack 104. Socket 102 is mounted on a printed circuit (PC) board 100, while jack 104 is connected to an unshielded CAT5 cable 106. Connector 102-104 provides a 100 Mb Ethernet connection to PC board 100 via a conductive transmission medium, which is illustratively a CAT5 cable 106. Jack 104 has eight pins 110 connected to the eight tip and ring leads (conductors) J1-J8 of the four twisted-wire pairs of cable 106 which mate with corresponding eight receptacles 112 of socket 102. Socket 102 connects cable 106 to PC board 100 by means of a transmission medium comprising leads 118 and pads P1-P8. Socket 102 has a conductive shield 114 that is connected to ground 116.

Each of the two active twisted pairs of cable 106 is connected to signal-conditioning circuitry in socket 102. Tip lead J1 and ring lead J2 are each connected via a serial pair of common-mode rejection filters 120 and 122 to one side of a transformer 124, whose center tap is connected via a resistor 126 to a conductor 140. Illustratively, the two filters 120 share a common ferrite core, as do the two filters 122. The other side of transformer 124 is connected to a first pair of pads, and its center tap is connected to a third pad of pads P1-P8, or is left floating. Correspondingly, tip lead J3 and ring lead J6 are connected via a serial pair of common-mode rejection filters 130 and 132 to one side of a transformer 134, whose center tap is connected via a resistor 136 to conductor 140. Illustratively, the two filters 130 share a common ferrite core, as do the two filters 132. The other side of transformer 134 is connected to a second pair of pads and its center tap is connected to a sixth pad of pads P1-P8, or is left floating. Each transformer 124 and 134 may be thought of as connecting together two segments of each of three conductors. Conductor 140 connects the leads J4-J5 and J7-J8 of inactive twisted pairs of cable 106 to ground 116 via a DC-blocking capacitor 142. Illustratively, the turns ratio of the windings of each transformer 124 and 134 is 1:1±3%, resistors 126 and 136 are each about 75Ω, and capacitor 142 is about 1,000 pF. As described so far, RJ45 connector 102-104 is conventional.

Figure 2:
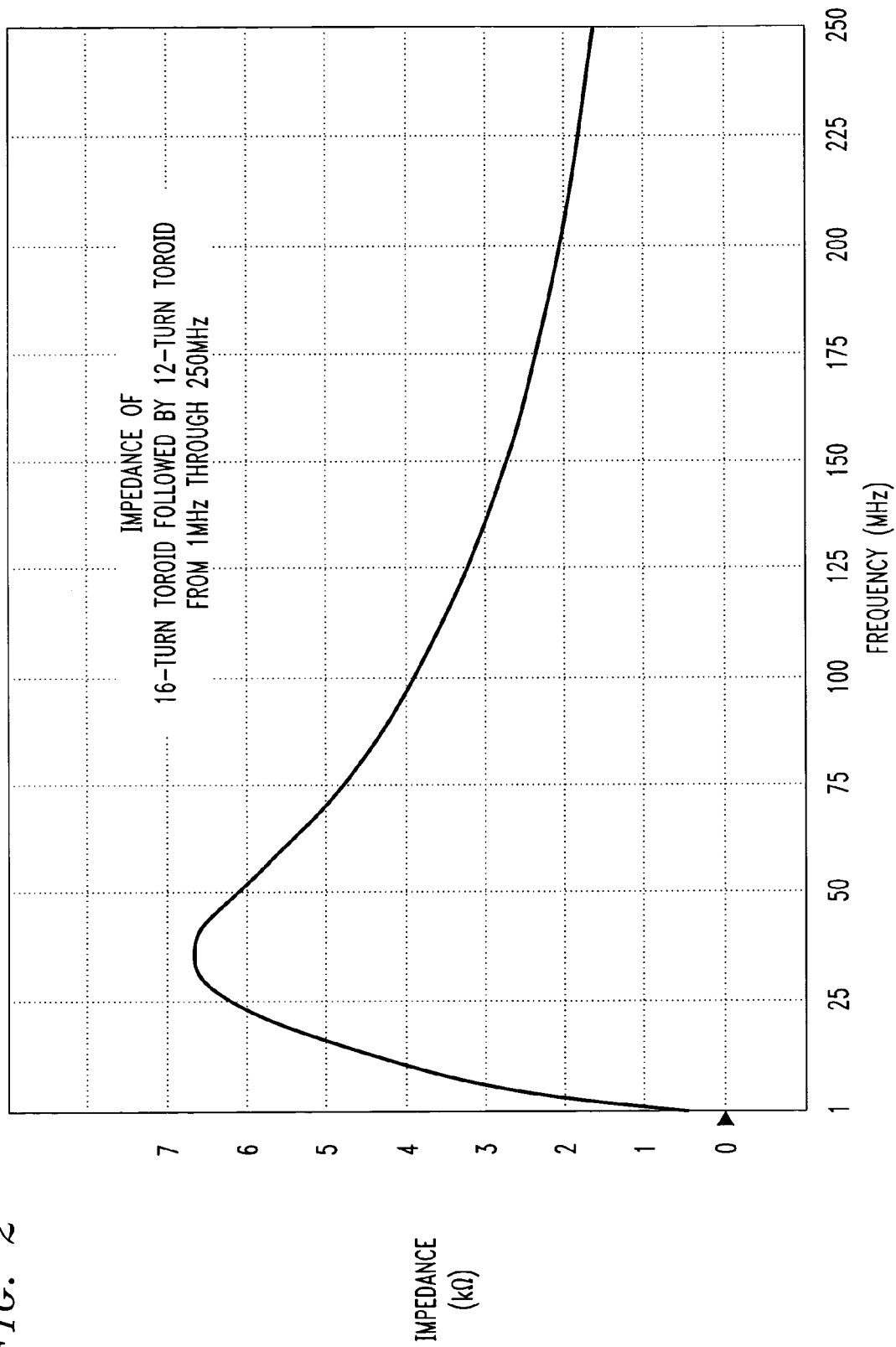
FIG. 2 is a frequency vs. impedance diagram of filter pairs 120-122 and 130-132 of the connector of FIG. 1.
Figure 3:
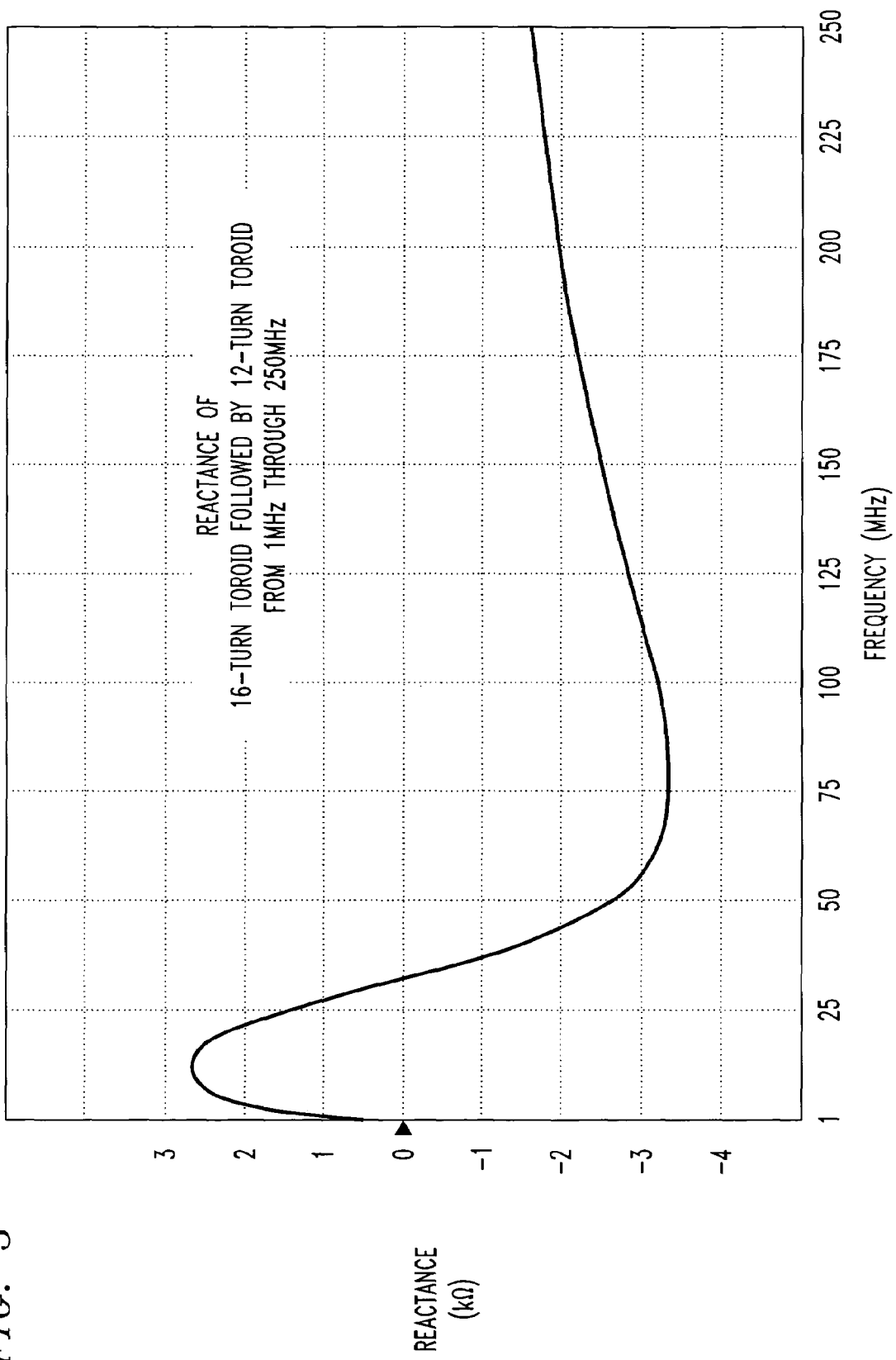
FIG. 3 is a frequency vs. reactance diagram of filter pairs 120-122 and 130-132 of the connector of FIG. 1.
Figure 4:
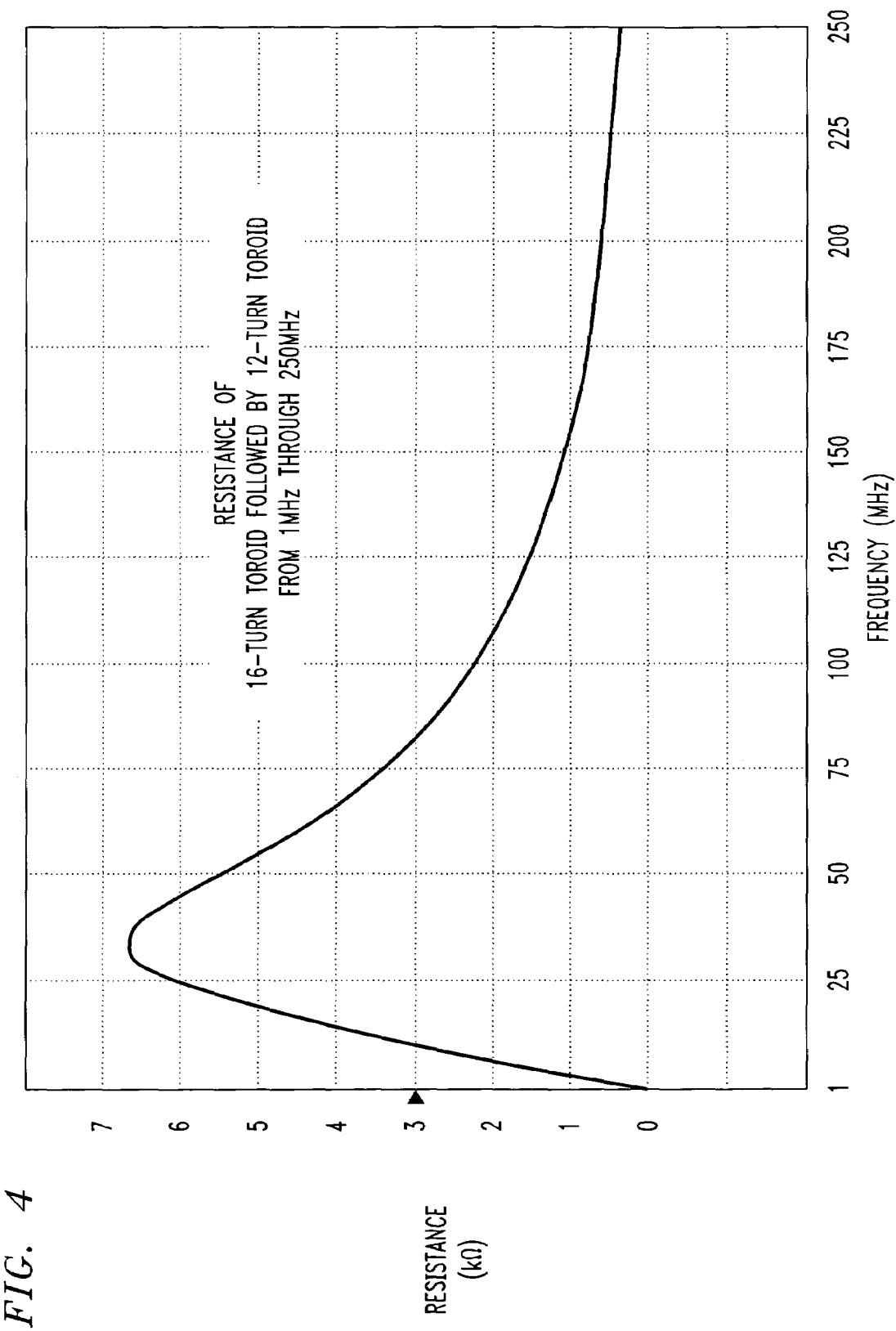
FIG. 4 is a frequency vs. resistance diagram of filter pairs 120-122 and 130-132 of the connector of FIG. 1.

According to one aspect of the invention, each pair of filters 120-122 and 130-132 are selected such that the pair's impedance, reactance, and resistance substantially meet or exceed the respective curves 200, 300, and 400 shown in FIGS. 2-4, respectively. These curves have been empirically determined to ensure that the radiated emissions from the two active twisted-wire pairs of cable 106 remain below the limits set by the Class B standard. This requirement is illustratively met by filters 122 and 132 each having 16 turns and filters 120 and 130 each having 12 turns. These requirements are illustratively met by a large toroid part no. 5943000101 and a small toroid part no. 5943000801 from Fair-Rite, Inc. The toroids' core material is number 43 material of Fair-Rite, Inc. While the serial order of filters 122/132 and 120/130 could be reversed, it has been empirically found that the sequence of the filters as shown in FIG. 1 gives superior performance.

Figure 5:
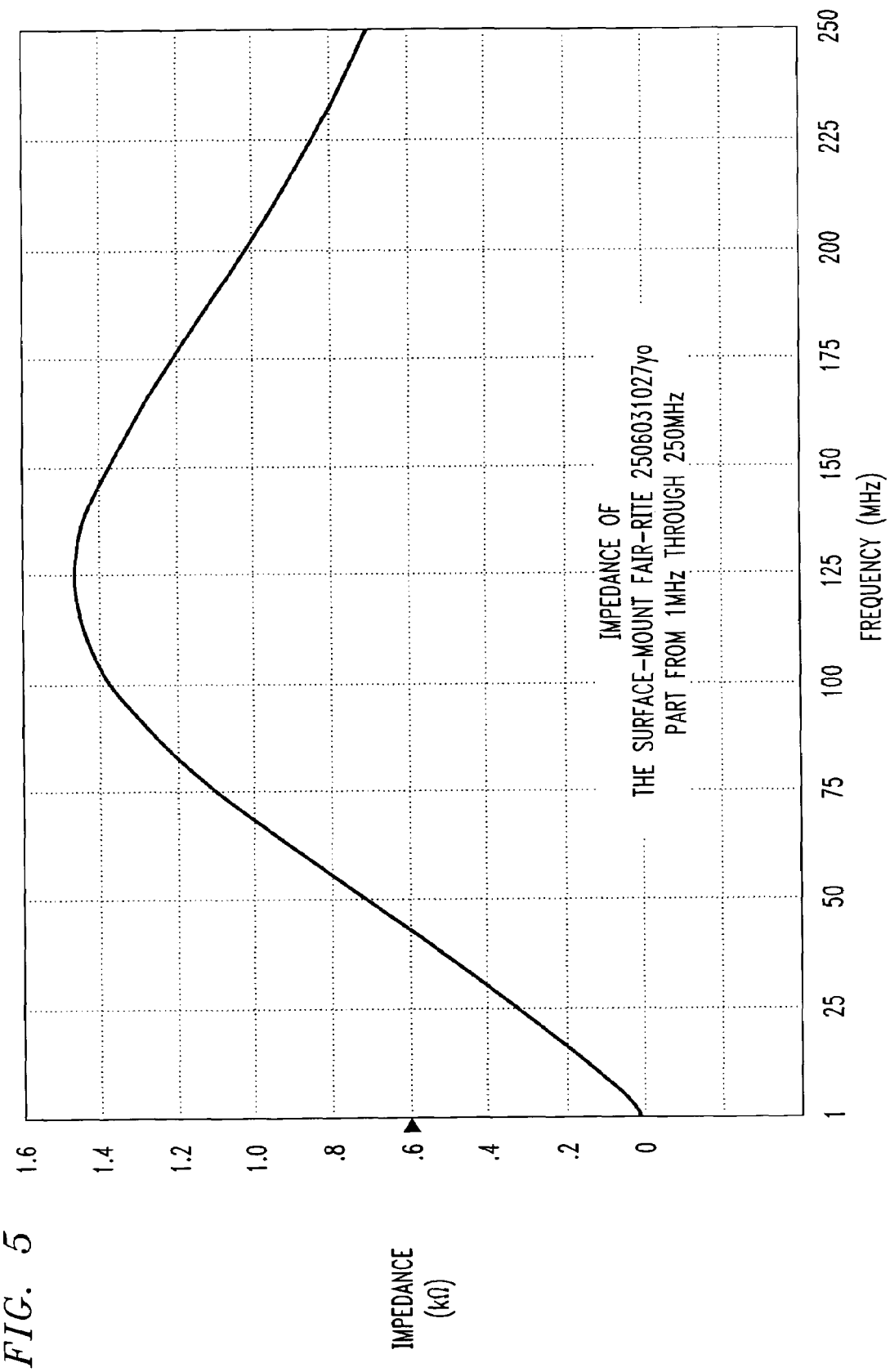
FIG. 5 is a frequency vs. impedance diagram of filter 150 of the connector of FIG. 1.
Figure 6:
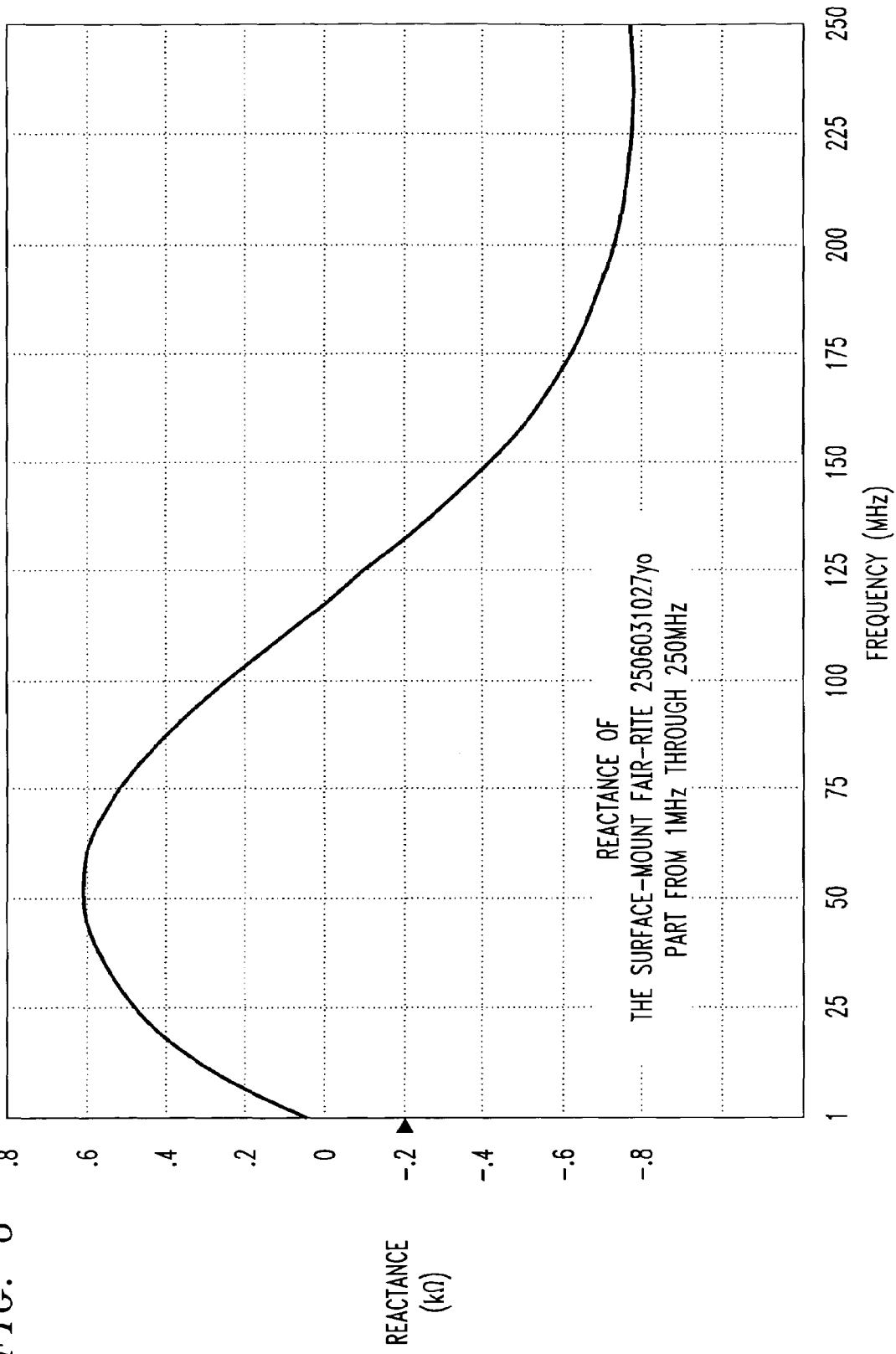
FIG. 6 is a frequency vs. reactance diagram of filter 150 of the connector of FIG. 1.
Figure 7:
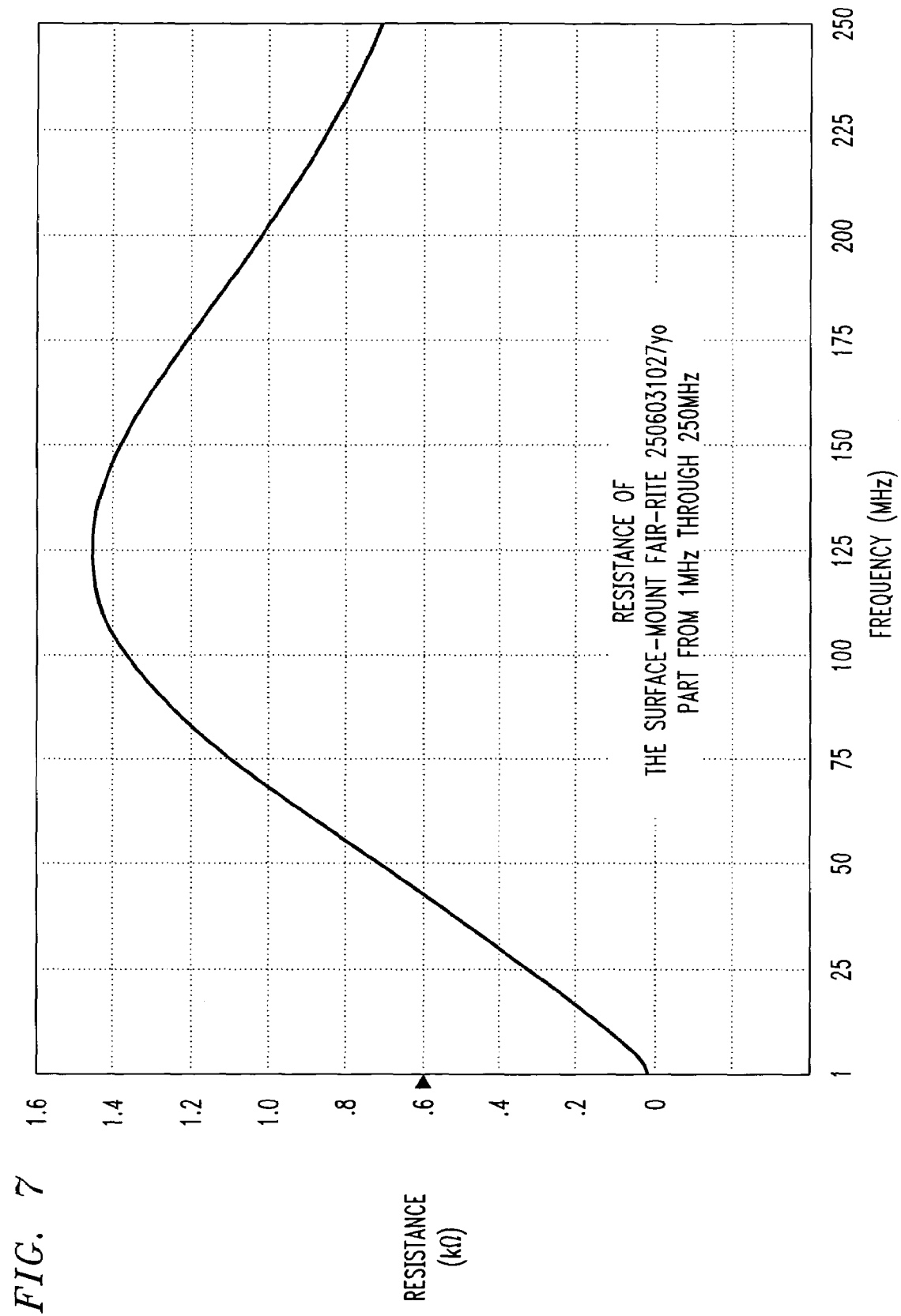
FIG. 7 is a frequency vs. resistance diagram of filter 150 of the connector of FIG. 1.

According to another aspect of the invention, conductor 140 is connected to leads J4, J5, J7, and J8 of the inactive twisted pairs of cable 106 across a current-blocking filter 150. Filter 150 blocks any current that might be conducted to lead 140 by transformers 126 and 136 or ground 116 from reaching cable 106. Filter 150 is selected such that its impedance, reactance, and resistance meet or exceed the respective curves 500, 600, and 700 shown in FIGS. 5-7. These curves have been empirically determined to ensure that the radiated emissions from the two inactive twisted-wire pairs of cable 106 remain below the limits set by the Class B standard. This requirement is illustratively met by ferrite part no. 2506031027yo from Fair-Rite, Inc. The ferrite material is Y-type material from Fair-Rite, Inc. It is a surface-mount 0603-size part.

Of course, various changes and modifications to the illustrative embodiment described above will be apparent to those skilled in the art. For example, the signal-conditioning circuitry can be implemented in the connector jack instead of the socket, or can be divided among the jack and the socket. Or, the connector can be used to advantage with other types of cable, including CAT3, CAT5+, and CAT6 cable. Or, instead of being shorted to each other, leads J4, J5, J7, and J8 may be connected to filter 150 each by its own 50Ω resistor. Such changes and modifications can be made without departing from the spirit and the scope of the invention and without diminishing its attendant advantages. It is therefore intended that such changes and modifications be covered by the following claims except insofar as limited by the prior art.

What is claimed is:

1. An apparatus comprising:
   at least one of a socket and a corresponding jack that together form a connector for a data transmission medium comprising a plurality of pairs of conductors, comprising
   for each conductor of each active pair of the pairs of conductors, a pair of common-mode filter inductors connected in series with each other and with the conductor, the pair of inductors having impedance, reactance and resistance characteristics; wherein said impedance, reactance and resistance characteristics substantially meeting or exceeding an impedance curve of FIG. 2, a reactance curve of FIG. 3, and a resistance curve of FIG. 4, respectively, and
   a direct current-blocking inductor connected in series with each conductor of each inactive pair of the pairs of conductors and ground, the inductor having impedance, reactance and resistance characteristics; wherein said impedance, reactance and resistance characteristics substantially meeting or exceeding an impedance curve of FIG. 5, a reactance curve of FIG. 6, and a resistance curve of FIG. 7, respectively.

2. The apparatus of claim 1 further comprising:
   a capacitor connected in series between the direct-current blocking inductor and ground; and
   for each said active pair of the conductors, a transformer having a pair of windings connected between the conductors of the pair and inductively coupling first portions of the conductors of the pair to second portions of the conductors of the pair.

3. The apparatus of claim 2 further comprising:
   a winding of each transformer having a center tap connected across a resistor and the capacitor to the ground.

4. The apparatus of claim 3 wherein:
   each transformer is substantially a 1:1 transformer and the center tap of the winding is connected to the first portions of the conductors which include the pair of filters.

5. The apparatus of claim 4 wherein:
   a first filter of each pair of filters is connected to the winding of the corresponding transformer across a second filter of said pair of filters and comprises fewer winding turns than the second filter.

6. The apparatus of claim 5 wherein:
   the first filter of each pair of filters comprises 12 winding turns and the second filter of each pair of filters comprises 16 winding turns.

7. The apparatus of claim 1 wherein:
   the transmission medium (a) is adapted to connect through the connector to an unshielded CAT5 cable, or (b) comprises an unshielded CAT5 cable.

8. The apparatus of claim 7 wherein:
   the connector is an RJ45 connector.

9. An apparatus comprising:
   one of a socket and a corresponding jack of an RJ45 connector, for connecting to a CAT5 unshielded data cable comprising a plurality of twisted pairs of conductors either directly or through the other of the socket and the jack, and comprising
   for each conductor of each active pair of the cable, a pair of common-mode filters connected in series with each other and with the conductor, the pair of filters having impedance, reactance and resistance characteristics; wherein said impedance, reactance and resistance characteristics substantially meeting or exceeding an impedance curve of FIG. 2, a reactance curve of FIG. 3, and a resistance curve of FIG. 4, respectively, and
   for each active pair of the cable, a transformer having a first and a second winding that have substantially a 1:1 turns ratio, the first winding connected in series between first portions of the conductors of the pair that include the filters and the second winding connected in series between second portions of the conductors of the pair and inductively coupling the first portions with the second portions, the first winding of each transformer having a center tap connected across a resistor and a capacitor to ground, and
   a ferrite connected in series between each conductor of each inactive pair of the cable and the capacitor the ferrite being connected by the capacitor to the ground, and the ferrite having impedance, reactance and resistance characteristics; wherein said impedance, reactance and resistance characteristics substantially meeting or exceeding an impedance curve of FIG. 5, a reactance curve of FIG. 6, and a resistance curve of FIG. 7, respectively.

10. The apparatus of claim 9 wherein:
    a first filter of each pair of filters is connected to the winding of the corresponding transformer across a second filter of said pair of filters and comprises fewer winding turns than the second filter.

11. The apparatus of claim 10 wherein:
    the first filter of each pair of filters comprises 12 winding turns and the second filter of each pair of filters comprises 16 winding turns.

12. The apparatus of claim 10 further comprising:
    the CAT5 cable, connected to either the one or of the socket or the corresponding jack.

* * * * *